United States Patent
Grayson et al.

(10) Patent No.: US 6,731,931 B1
(45) Date of Patent: May 4, 2004

(54) IDLE MODE MEASUREMENT

(75) Inventors: Mark Grayson, London (GB); Dennis Roy Mullins, London (GB); Keith Norman Guy Hungerford, Balmain (AU); Richard Wyrwas, London (GB)

(73) Assignee: ICO Services Ltd., London (GB)

( * ) Notice: Subject to any disclaimer, the term of this patent is extended or adjusted under 35 U.S.C. 154(b) by 0 days.

(21) Appl. No.: 09/250,401

(22) Filed: Feb. 16, 1999

(30) Foreign Application Priority Data

Jun. 24, 1998 (EP) .............................. 98304957

(51) Int. Cl.$^7$ ................................. H04Q 7/20
(52) U.S. Cl. .................. 455/430; 455/437; 455/69; 455/13.4; 455/522
(58) Field of Search ............... 455/423, 425, 455/426, 427–430, 67.3–67.4, 226.3, 226.2, 437, 12.1, 13.1, 13.4, 24, 68–69, 561, 434, 522, 447, 438, 439, 445, 450

(56) References Cited

U.S. PATENT DOCUMENTS

| | | | | |
|---|---|---|---|---|
| 5,267,262 A | * | 11/1993 | Wheatley, III | 455/522 |
| 5,394,561 A | | 2/1995 | Freeburg | 455/428 |
| 5,410,733 A | * | 4/1995 | Niva et al. | 455/437 |
| 5,487,180 A | * | 1/1996 | Ohtake | 455/522 |
| 5,577,087 A | * | 11/1996 | Furuya | 375/377 |
| 5,790,954 A | * | 8/1998 | Tayloe et al. | 455/437 |
| 5,966,657 A | * | 10/1999 | Sporre | 455/426 |
| 5,991,622 A | * | 11/1999 | Henry, Jr. | 455/434 |
| 6,006,077 A | * | 12/1999 | Shull | 455/226.2 |
| 6,072,985 A | * | 6/2000 | Wismer | 455/12.1 |
| 6,088,573 A | * | 7/2000 | Tsuda | 455/13.4 |
| 6,112,066 A | * | 8/2000 | Hofmann et al. | 455/226.2 |
| 6,147,981 A | * | 11/2000 | Prescott | 370/318 |
| 6,298,220 B1 | * | 10/2001 | Barnhart et al. | 455/69 |
| 6,643,520 B1 | * | 11/2003 | Park et al. | 455/522 |

FOREIGN PATENT DOCUMENTS

| | | |
|---|---|---|
| EP | 0 365 885 A2 | 5/1990 |
| EP | 0 662 758 A2 | 7/1995 |
| EP | 0 869 628 A1 | 10/1998 |
| GB | 2 288 913 A | 11/1995 |
| GB | 2 293 725 A | 4/1996 |
| GB | 2 295 296 A | 5/1996 |
| GB | 2 303 764 A | 2/1997 |
| WO | WO 97/12475 | 4/1997 |
| WO | WO 98/21912 | 5/1998 |

OTHER PUBLICATIONS

"The GSM System for Mobile Communications", by Michel Mouly, et al., Mobil and Security Management, pp. 476–492.

"International Conference on Maritime and Aeronautical Satellite Communication and Navigation", Mar. 7–9, 1978, pp. 119–122.

* cited by examiner

*Primary Examiner*—Vivian Chin
*Assistant Examiner*—Charles Craver
(74) *Attorney, Agent, or Firm*—Michael J. Donohue; Davis Wright Tremaine LLP (57) ABSTRACT

In a cellular satellite mobile telecommunication system, cell reception measurements for cell broadcast channels (BCCH) at a user terminal (UT 1) are made in an idle mode when no call is being made. At the commencement of a call, the measurement information (31, FIG. 8) relating to the measurement made in the idle mode is encoded onto a slow control channel (SACCH $_{up}$) associated with a speech channel (TCH) for speech communication from the user terminal to a remote ground station (SAN 1) via a satellite (3*a*), and the power of the speech channel transmitted to the user terminal from the satellite, and from the UT to the satellite, for the call, is set in dependence upon the report. The reported data can also be used to determine whether to make a cell or satellite handover.

12 Claims, 5 Drawing Sheets

| Cell | BCCH Quality |
|------|--------------|
| C0 | 9 |
| C1 | 3 |
| C2 | 2 |
| C3 | 4 |
| C4 | 5 |
| C5 | 2 |
| C6 | 1 |
| C7 | 9 |

BCCH Idle Mode Measurements

IDLE MODE MEASUREMENT

FIELD OF THE INVENTION

This invention relates to improvements in and relating to reporting cell reception measurement information from a user terminal in a cellular satellite telecommunications system, and has particular application to a user terminal for the telecommunications system and also a remote subsystem for communicating with the user terminal.

BACKGROUND

Terrestrial mobile telecommunications systems are well known and a number of different systems have developed which operate according to different standards. These public land mobile networks (PLMNs) may operate according to analog or digital standards. In Europe, the Far East, excluding Japan and elsewhere, the Global System Mobile (GSM) network has become popular, whereas in USA, the Advanced Mobile Phone Service (AMPS) and the Digital American Mobile Phone System (DAMPS) are in use, and in Japan, the Personal Handiphone System (PHS) and the Personal Digital Communication (PDC) network are used. More recently, proposals have been made for a Universal Mobile Telecommunications System (UMTS). These networks are all cellular and land-based with transmitter/receivers which communicate with mobile user terminals.

Considering for example the GSM system, individual cells of the mobile network are served by a series of geographically spaced, terrestrial base station subsystems (BSS) which each comprise a base transceiver stations (BTS) which are coupled through base station controllers (BSCs) to a mobile switching centre (MSC) which may provide a gateway out of the network to a conventional public switched telephone network (PSTN). The PLMN includes a home location register (HLR) which stores information about the subscribers to the system and their user terminals (UTs). When a UT is switched on, it registers with the HLR. If the user roams to a different GSM network, the user terminal registers with a visitor location register (VLR) of the visited network, which communicates with the HLR of the home network for routing and other purposes. DAMPS, PHS and PDC networks have a generally similar architecture.

The user terminal is operable in an idle mode when no call is being made, and a so-called dedicated mode for the duration of a call. The telephone call is routed to the subscriber's UT through the MSC, to the BSC and then to the selected BTS, which provides a full duplex channel to the UT. The channel comprises a downlink channel from the BTS to the UT and an uplink channel from the UT to the BTS. The channels include time division multiple access (TDMA) time slots on frequencies in a hopping sequence allocated on initiation of the call.

In a GSM system, the telephone call is directed over a dedicated traffic channel or TCH. Each TCH has an associated slow rate control channel or SACCH, which is interleaved with the TCH. These channels are described in more detail on pp 195–201 of "The GSM System for Mobile Communications" by M. Mouly and M-B. Pautet, 1992 Cell & Sys, ISBN: 2-9507190-0-7.

Also, a number of common channels are provided for all UTs within a particular cell. A broadcast control channel BCCH is broadcast from the BTS to all UTs within a particular cell, which provides information that identifies the cell to each UT. The BCCH is received by the UT in the idle mode i.e. when no call is being made. Each cell has is own BCCH, so the relative signal strengths of the BCCHs at the UT can be used to determine which cell can best be used for TCH/SACCH communication with the UT. Other system information may be transmitted to the UTs of a particular cell in the BCCH.

The SACCH communicates control information between the UT and the BSS. In particular, the SACCH is used for power control, so as to control the power of signals transmitted by the BTS to the UT, and to control the power of signals transmitted from the UT to the BTS, in order to conserve battery power in the UT.

On commencement of a call, initial UT power level settings are transmitted from the MSC/BSC in the downlink SACCH to the BTS and the UT. These initial settings are default values to get the power control process up and running at the start of the call. The UT then periodically measures the quality of the received signals on the downlink, for example, every 0.5 sec. and the measured values are transmitted back on the SACCH uplink to the BTS and then to the BSC. The BSC includes processing circuitry to update the power settings and appropriate instructions are then communicated from the BSC to the BTS and the UT using the downlink SACCH in order to update their power settings.

The quality measurements carried out at the UT consist of successive measurements of the bit error rate (BER) in signals received from the BTS through the downlink, the measurement values being an average of the BER over a measurement period e.g. 0.5 sec.

The BSC uses these measurement values and its own measurements of received UT uplink emissions to calculate a desired power transmission level for the BTS and the UT, the desired power level being computed as a function of the average BER.

A number of different mobile telecommunication systems have been proposed that use satellite communication links to the mobile user terminals. One network known as the IRIDIUM™ satellite cellular system is described in for example EP-A-0365885 and U.S. Pat. No. 5,394,561 (Motorola), which makes use of a constellation of so-called low earth orbit (LEO) satellites, that have an orbital radius of 780 km. Mobile user terminals such as telephone handsets are configured to establish a link to an overhead orbiting satellite, from which a call can be directed to another satellite in the constellation and then typically to a ground station which is connected to conventional land-based networks.

Alternative schemes which make use of so-called medium earth orbit (MEO) satellite constellations have been proposed with an orbital radius in the range of 10–20,000 km and reference is directed to Walker J. G. "Satellite Patterns for Continuous Multiple Whole Earth Coverage" Royal Aircraft Establishment, pp 119–122 (1977). These orbits are also known as intermediate earth orbits (IEOs). The ICO™ satellite cellular system described for example in GB-A-2 295 296 includes a constellation of MEO satellites. Communication does not occur between adjacent satellites and instead, a signal from a mobile user terminal such as a mobile handset is directed firstly to the satellite and then directed to a ground station or satellite access node (SAN), connected to a land-based telephone network. This has the advantage that many components of the system are compatible with known digital terrestrial cellular technology such as GSM.

In satellite communications networks, ground stations are located at different sites around the world in order to communicate with the orbiting satellites. In the ICO™ system and others, a visitor location register is associated with each of the satellite ground stations, which maintains a record of the individual user terminals that are making use of the particular ground station.

It would be advantageous in a satellite telecommunication system, to control the power level of the individual UTs and the power of the satellite transmission which conveys signals from the satellite to the UT. This would conserve battery power for the UT and also would conserve power in the satellite, which has a limited power supply from its solar panels and batteries. It has therefore been proposed to include a power control arrangement, which makes use of measured values of a quality metric for signals received at the UT so that the satellite and UT can be commanded to operate at an optimum power level. However, at the initiation of a call, the use of initial default power setting levels as in a conventional terrestrial GSM system previously described, would give rise to certain problems. With satellite systems, the transit time for signals between the ground station, the satellite and the UT is significantly greater than the corresponding transit times for terrestrial mobile networks, so that if the prior GSM protocol were adopted, there would be a significant delay at the start of a call before a measured value of received signal quality was used to set the transmission power, because the system would first have to use initial default power setting values and wait for measured values to be reported from the UT. This would involve sending the description of neighbouring cells to be measured, to the UT, followed by a measuring procedure for the cells, followed by reporting the outcome from the UT to the ground station, which would be wasteful of satellite and UT power. Also, the range of power level variation needed is greater than with terrestrial systems and so the default initial power setting values would need to be greater than with a terrestrial system in order to ensure satisfactory performance at the start of a call, which would also be wasteful of power.

Also, there would be a significant delay at the commencement of a call before data would be collected from the UT at the ground station to determine the quality of reception at the UT, which gives rise to difficulties. For example, in a satellite system, the user terminal may be able to communicate via cells provided by different satellites concurrently, and it may be desirable to route the call through one of them to avoid call traffic congestion in the other satellite, but this decision cannot be taken without data concerning the reception quality and hence cannot readily be taken at the start of the call.

SUMMARY OF THE INVENTION

The present invention involves reporting cell reception measurement information from a user terminal in a cellular telecommunications system, in which a cell reception measurement at the user terminal is made in an idle mode when no call is being made. Prior to commencement of a call, measurement information relating to the measurement made in the idle mode is reported to a location remote from the user terminal, and characteristics of signals transmitted to the user terminal for the call are set in dependence upon the report.

Thus, the delays that would be associated with prior art systems are reduced at the start of the call.

The present invention thus provides a method of reporting cell reception measurement information from a user terminal in a cellular telecommunications system, comprising making a cell reception measurement at the user terminal in an idle mode when no call is being made, and prior to commencement of a call, reporting measurement information relating to the measurement made in the idle mode to a location remote from the user terminal, for setting characteristics of signals transmitted to the user terminal for the call.

The report may be made when the user terminal switches into a dedicated mode to make a call and may comprise a report of a measurement of the quality of reception of a cell broadcast channel in the idle mode.

A measurement of cell broadcast channels for a number of different cells may be to provide the measurement information, to permit a decision to be made concerning a cell handover for the call.

A determination may be made of the cell with the best reception quality, and data concerning the best cell and its reception quality is reported in the measurement information.

The method according to the invention can be used for a satellite system wherein cells are made available to the user terminal by more than one satellite concurrently, and the method may include determining the best cell for each available satellite and providing data concerning the best cells and the reception quality thereof in the reported measurement information. Thus, data is provided which allows a choice to be made concerning the satellite to be used for the call, for example to relieve traffic congestion for one of the satellites.

The invention also provides a user terminal for use in a cellular telecommunications system, comprising receiver circuitry configured to make a cell reception measurement in an idle mode when no call is being made, and transmitter circuitry operable prior to commencement of a call, to report measurement information relating to the measurement made in the idle mode to a location remote from the user terminal, for setting characteristics of signals transmitted to the user terminal for the call.

In another aspect, the invention provides a method of operating a subsystem for use in a cellular telecommunications system to communicate with remote user terminals, comprising receiving from a remote user terminal, a report of cell measurement information corresponding to a cell reception measurement made by the user terminal in an idle mode when no call is being made, the report being made to the subsystem prior to commencement of a call, and setting characteristics of signals transmitted to the user terminal for the call in dependence on the report.

The power level for signals for the call may be set in dependence upon the report. Also, a decision to make a cell handover and a choice of cell for the handover may be made on the basis of the report.

The invention also includes a subsystem for use in a cellular telecommunications system to communicate with remote user terminals, comprising: means to receive from a remote user terminal, a report of cell measurement information corresponding to a cell reception measurement made by the user terminal in an idle mode when no call is being made, the report being made to the subsystem prior to commencement of a call, and setting means to set characteristics of signals transmitted to the user terminal for the call in dependence on the report.

The subsystem may comprise a ground station for a satellite telecommunications system, wherein the setting means is operable to transmit a setting signal towards a satellite for controlling a transmission characteristic thereof for the call. The cell report information may include data concerning diverse communication paths for the call to the user terminal via different satellites, and the setting means may be operable to select one of the paths for the call.

In another aspect, the invention provides a signal transmitted by a user terminal for a cellular telecommunications system, at the start of a call, comprising a speech channel with an associated control channel, a message concerning the quality of reception at the user terminal measured prior to the call being transmitted in the control channel. The message may include data concerning the quality of reception for different cells of the system.

BRIEF DESCRIPTION OF THE DRAWINGS

In order that the invention may be more fully understood an embodiment thereof will now be described by way of example with reference to the accompanying drawings, in which:

FIG. 3 is a schematic block diagram of the circuits of satellite 3a;

FIG. 4 is a schematic diagram of the cell pattern produced from the spot beams of satellite 3a;

DETAILED DESCRIPTION

Overview of Network

Figure 1:
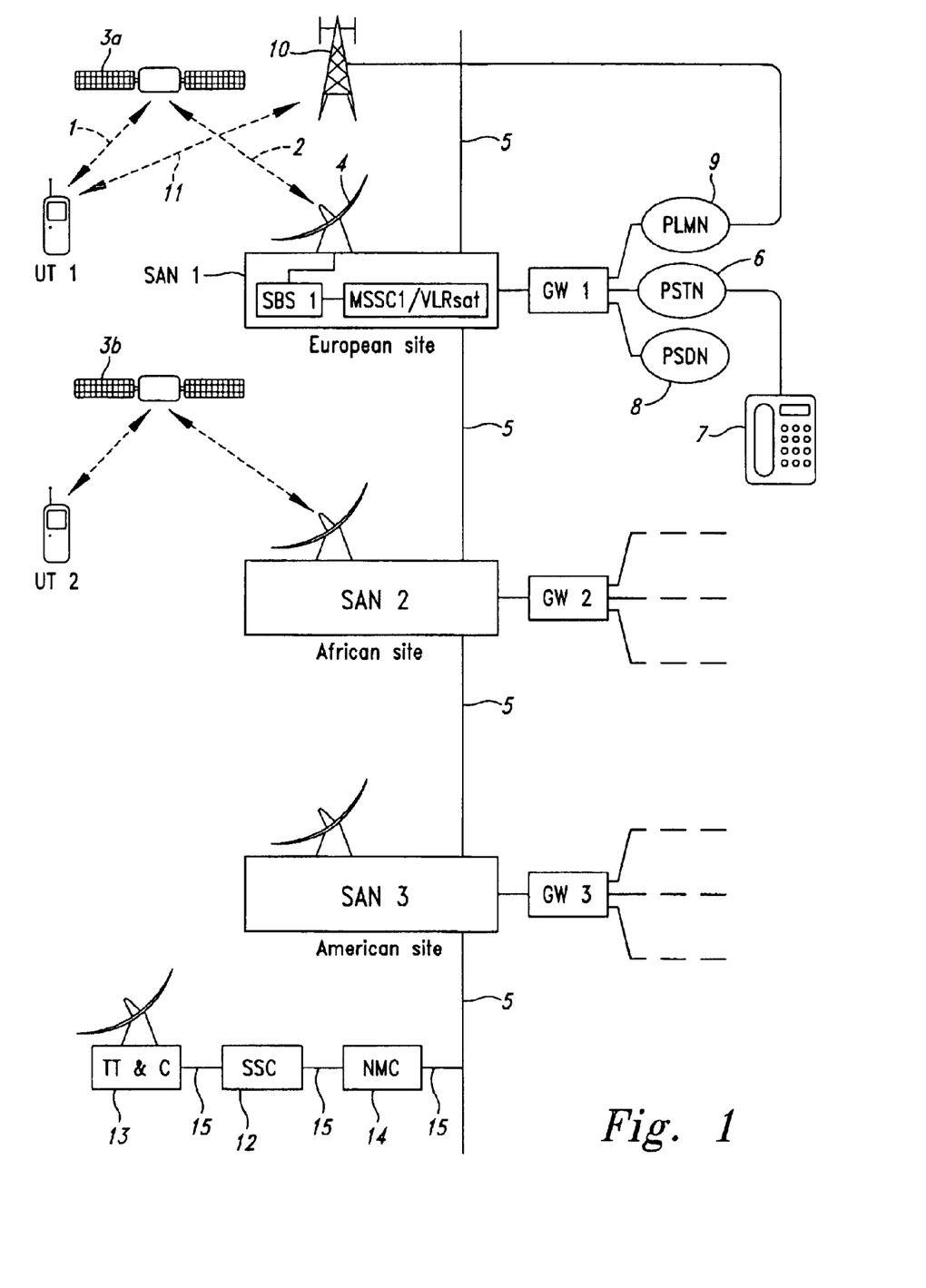
FIG. 1 is a schematic diagram of a satellite telecommunications system together with a local, land-based mobile telecommunications system, in accordance with the invention.

Referring to FIG. 1, a schematic block diagram of a satellite mobile telecommunication network is shown corresponding to the ICO™ network. A mobile user terminal UT 1 in the form of a mobile telephone handset can communicate on a radio channel over a communication path 1, 2 via an earth orbiting satellite 3a with a land-based satellite access node SAN 1. As shown schematically in FIG. 1, SAN 1 is provided with an antenna configuration 4 which can track the orbiting satellite. The antenna configuration 4 may include five dish antennae for tracking individual ones of the satellites 3.

A number of the satellite access nodes SAN 1, 2, 3, etc are connected together to form a backbone network 5, which is connected through a number of gateways GW 1, 2, 3, etc to conventional land-based telephone networks. For example, the gateway GW 1, is connected to a land-based public switch telephone network (PSTN) 6, which permits connection to be made to a conventional telephone set 7. The gateway GW1 is additionally connected to a public switch data network (PSDN) 8 and a public local mobile network (PLMN) 9. Each of the gateways GW1, 2, 3 may comprise existing International Switching Centres or mobile switching centres (MSCs) of the type used in GSM mobile networks.

As shown in FIG. 1, the handset UT 1 can also communicate with the conventional land-based mobile network PLMN 9, which is shown schematically to include a transceiver station 10 that establishes a duplex link with the user terminal UT 1. In this example, the PLMN 9 is a GSM network.

For a fuller understanding of GSM, reference is directed to the various GSM Recommendations issued by the European Telecommunications Institute (ETSI). Also reference is directed to "The GSM System for Mobile Communications" supra, for a more readable overview.

The satellite network is designed to provide worldwide coverage and the satellites 3a, 3b form part of a constellation of satellites, which may be arranged in several orbits. In one example, two orbits of five satellites are used, which can be shown to provide coverage of a major part of the surface of the earth, in which for a 10° satellite elevation angle, one satellite can be accessed by the mobile handset all of the time and two satellites can be accessed for at least 80% of the time, thereby providing system redundancy. Additional satellites may be included in the constellation in order to provide further redundancy and diversity.

The satellites may be arranged in a MEO constellation, for example with an orbital radius of 10,355 km, although the invention is not restricted to a particular orbital radius. In this embodiment, satellites 3a, 3b are shown in a common orbit and the satellites are tracked by the antenna arrangement of each SAN. The SANs are spaced around the earth in order to provide continuous coverage. In the example shown, SAN 1 may be located in Europe whereas SAN 2 may be located in Africa, SAN 3 in America and other SANs may be located elsewhere.

SAN 1 consists of a satellite base station SBS 1 which is coupled to the five dish antennas 4 for tracking the satellites, the SBS 1 including transmitter and receiver circuits with amplifiers, multiplexers, demultiplexers and codecs. A mobile satellite switching centre MSSC 1 is coupled to SBS 1 and includes a satellite visitor location register $VLR_{SAT}$ 1. MSSC 1 couples communication signals to the backbone network 5 and to the SBS 1, so as to allow individual telephone calls to be established through the backbone network 5 and the duplex communication link 1, 2 via the satellite 3a, to the mobile terminal UT 1. Also, MSSC 1 is connected to the gateway GW1 so as to provide an output connection to PLMN 9, together with PSDN 8 and PSTN 6. The $VLR_{SAT}$ 1 maintains a record of each of the subscribers currently registered, namely the identity of each user that is making use of the SAN 1 for signal communication. It will be understood that all the SANs are of similar construction with a respective $VLR_{SAT}$ to maintain a record of the subscribers currently registered.

In FIG. 1, the SAN 2 is shown communicating with user terminal UT 2 via satellite 3b. For further details of the network, reference is directed to GB-A-2 295 296 and EP-A-0 869 628.

The satellites 3a, 3b are in non-geostationary orbits and comprise generally conventional hardware such as the Hughes HS 601. They may include features disclosed in GB-A-2 288 913. Each satellite 3a, 3b is arranged to generate an array of radio beams covering a footprint on the earth beneath the satellite, each beam including a number of different frequency channels and time slots as described in GB-A-2 293 725. The beams thus provide adjacent cellular areas which correspond to the cells of a conventional land-based mobile telephone network. The satellites are controlled by means of a satellite control centre (SCC) 12 and a telemetry tracking and control station (TT&C) 13, which are connected to a network management centre (NMC) 14 through a digital network 15 that is coupled to the backbone network 5. The SCC 12 and the TT&C 13 control operations of the satellites 3a, 3b, e.g. for setting the general transmission power levels and transponder input tuning, as directed by the NMC 14. Telemetry signals for the satellites 3a, 3b are received by the TT&C 13 and processed by the SCC 12 to ensure that the satellites are functioning correctly.

Channel Configuration

During a telephone call, each of the handsets communicates with a respective SAN via one of the satellites. Thus for example, handset UT 1 communicates with SAN 1 via satellite 3a over paths 1, 2. Full duplex communication is provided between the UT and the SAN. As referred to herein, communication from the SAN to the UT via the satellite is referred to as a "downlink", and communication directed from the UT via the satellite to the SAN is referred to as an "uplink".

Figure 2:
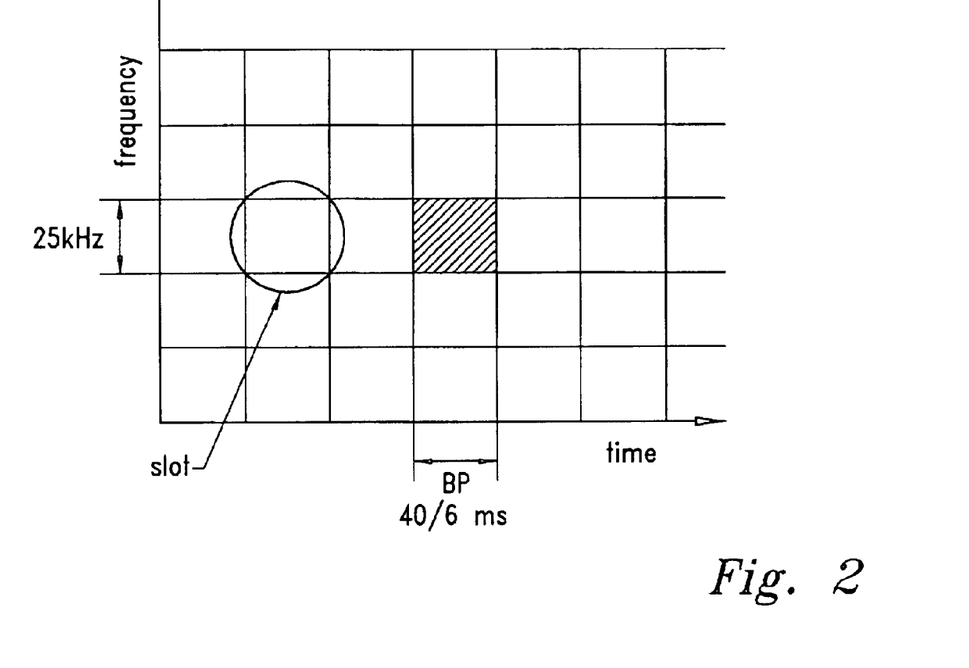
FIG. 2 is a schematic frequency/time diagram illustrating time slots for the FDMA transmission scheme.

The general configuration of the transmitted signals is similar to those used for conventional GSM transmissions in a PLMN and makes use of a frequency diverse time division multiple access (TDMA) scheme. Referring to FIG. 2, the basic unit of transmission between the SAN and UT is a series of about 100 modulated digital bits, which is referred to as a burst. Bursts each have a finite duration and occupy a finite part of the radio spectrum. Thus, they are sent in time and frequency windows which are referred to as slots. The slots are positioned every 25 kHz and recur in time every 40/6 ms. The duration of each slot is referred to as a burst period or BP. A graphical representation of a slot in the time and frequency domain is shown in FIG. 2.

The signal transmission scheme includes channels for providing communication between the UTs individually and one of the SANs via a satellite, together with a number of common channels for all UTs within the cell defined by a particular satellite spot beam. The configuration of some of the signal channels will now be described in more detail.

Individual Channels

For speech transmission, data is sent on an individual traffic channel TCH. Each TCH is provided with an associated slow rate control channel or SACCH. Each TCH consists of one slot every 6 BP and comprises a cycle of 25 slots. The SACCH is multiplexed in blocks each consisting of 12 consecutive slots. Two SACCH blocks are transmitted for every 25 slot cycle of the TCH and the remaining slot is used to transmit a timing reference so as to make up a 25 slot SACCH message for each 25 slot cycle of TCH. The SACCH messages each comprise approximately 100 information bits (1 burst), and are spaced apart in time by approximately 480 msec. It will be understood that the TCH/SACCH is transmitted when the UT is in dedicated mode i.e. during a call.

It will be appreciated that with the configuration, 6 TCHs can be interleaved due to the fact that each TCH consists of a slot every 6 BP. The resulting interleaved structure thus provides a frame of 6 TCHs every 6 BP. In contrast to GSM, no frequency hopping is used from slot to slot of the channel.

Common Channels

In addition to the channels TCH/SACCH to the individual UTs, a number of common channels are provided for all UTs within each cell corresponding to one of the satellite's spot beams, which will now be described in more detail.

A broadcast control channel BCCH is broadcast from the satellite to all UTs within a particular cell. The BCCH provides information which identifies the cell to the UT, which is received by the UT in idle mode i.e. when no call is being made. As each cell has is own BCCH, the relative signal strengths of the BCCHs at the UT can be used to determine which cell is to be used for TCH/SACCH communication with the UT. Other system information may be transmitted to the UTs of a particular cell in the BCCH in a similar manner to GSM. The BCCH message consists of a number e.g. 4 slots equally spaced every 100 BP.

The common channels also include a downlink paging logical channel PCH. This is used to transmit paging messages to a UT, for example to alert the user of the UT to an incoming call. Also an access grant logical channel AGCH indicates to the UT a channel allocated by the network, to be accessed by the UT for-speech communication (TCH/SACCH) in order to receive the incoming call. The PCH consists of e.g. 1 to 10 slots every 25 BP and the AGCH consists of e.g. 2, 4, 6, 8, 10 or 12 slots every 25 BP.

In addition to these downlink common channels, there is an uplink common channel which allows UTs within a cell to transmit access requests to the network, when it is desired to make a call from the UT. These requests thus occur essentially randomly in time and the channel is accordingly called the random access channel RACH. The RACH consists of e.g. of 2 slots every 3, 4 or 5 BP.

Information concerning the configuration of the RACH and how the UT should access the slots of the PCH are sent to the UT in the BCCH messages.

The common channels are transmitted on beacon frequencies for the cell concerned such that BCCH is transmitted on frequency f1, PCH/AGCH on f2 and RACH on f3. Adjacent cells have different beacon frequencies to distinguish them from one another. The beacon frequencies may themselves cycle between different values within their allocated frequency slot to provide a cw frequency acquisition portion at a first frequency followed by a data burst at a second frequency.

Satellite

Figure 3:
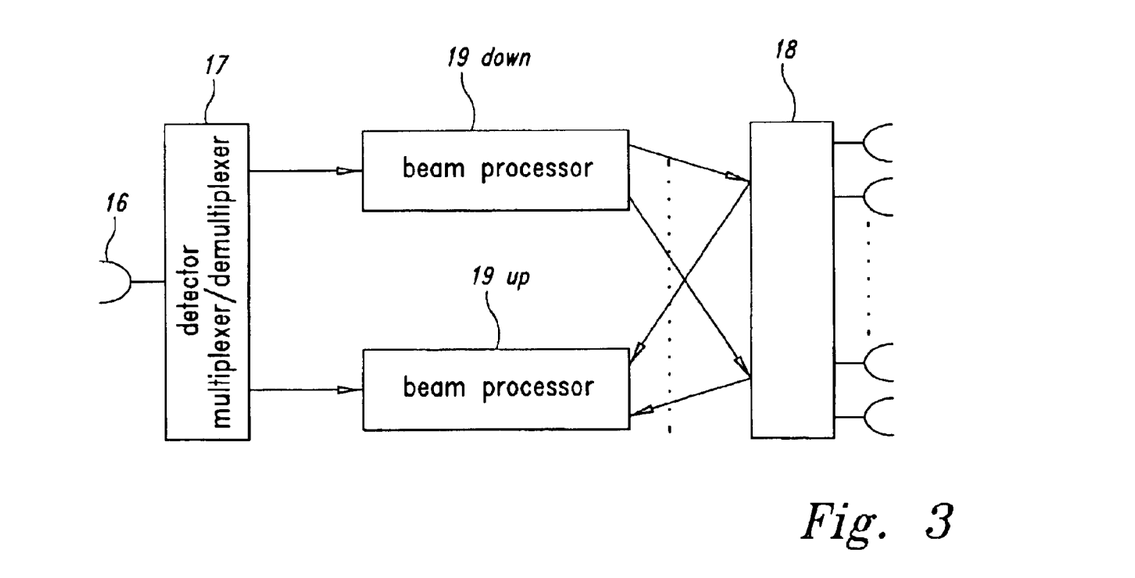

A schematic diagram of the major signal processing components of the satellite is given in FIG. 3. Signals transmitted from one of the SANs are received by antenna 16 and directed to a detector/multiplexer/demultiplexer circuit 17. It will be understood that the signal transmitted from the SAN to the satellite contains a large number of TCH/SACCHs that are to be directed to individual UTs by the satellite. To this end, the satellite includes a plurality (for example 163) of antennas 18 that produce individual spot beams that correspond to a cellular configuration as previously described. A beam forming processor circuitry configuration $19_{down}$ receives the various BCCHs TCH/SACCHs and PCH/AGCHs that are demultiplexed by circuit 17 and assembles them into multiplexed signals directed on 163 outputs to the spot beam antennas 18. The circuitry $19_{down}$ includes gain control functionality to allow the gain of individual TCH/SACCH channels to be dynamically altered, in response to commands from SAN 1 produced in SBS 1. These commands are encoded into signals on the downlink so that power control for individual TCH/$SACCHs_{down}$ from the satellite to the individual UTs can be controlled by SBS 1 with the result that the satellite appears transparent in the downlink signal transmission process as viewed from SAN 1.

For signals on the uplink from the individual UTs to the SAN, the various transmissions are received by the spot beam antennas 18 and directed to processing circuitry $19_{up}$ which combines the various channels and passes them to the multiplexer configuration in circuit 17 for transmission through the antenna 16 to the SAN.

Figure 4:
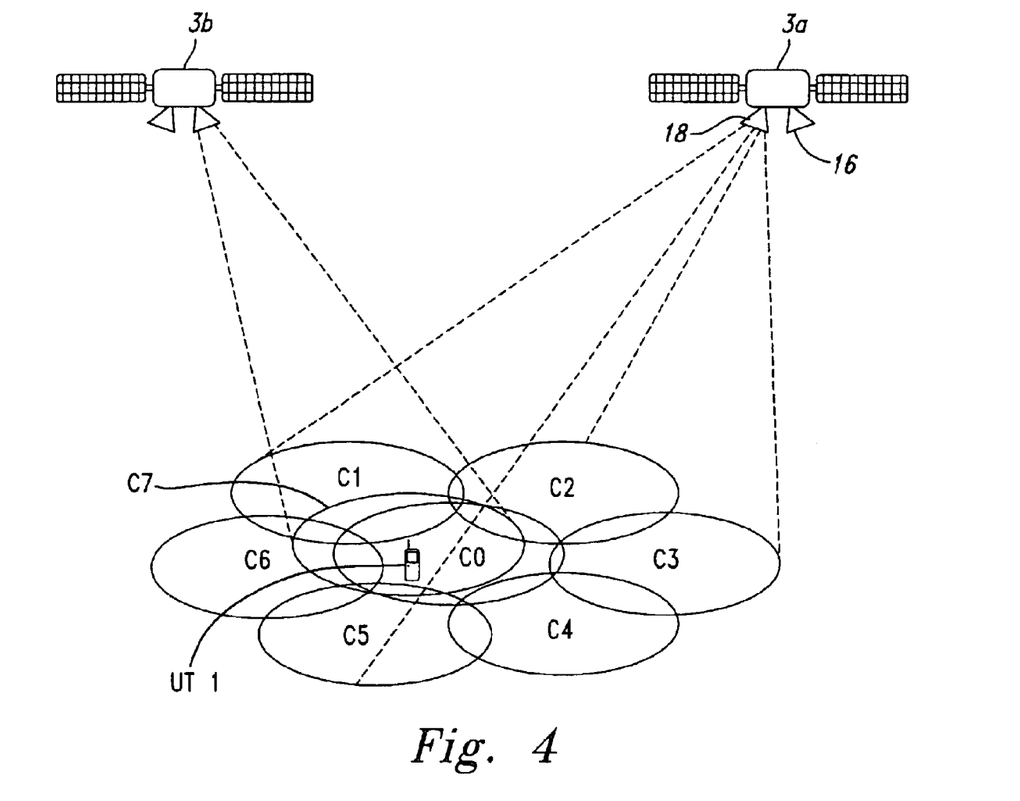

An example of cells C0–C6 produced by the footprints of seven of the 163 spot beams from antenna 18 is shown schematically in FIG. 4. The user terminal UT 1 lies within cell C0 but also can monitor the BCCHs of adjacent cells C1–C6. Cells from other available satellites are also monitored as shown schematically by cell C7 of satellite 3b.

It will be understood that the foregoing description of the satellite circuitry is schematic and for further details, reference is directed to GB-A-2 288 913 supra.

User Terminal (UT 1)

Figure 5:
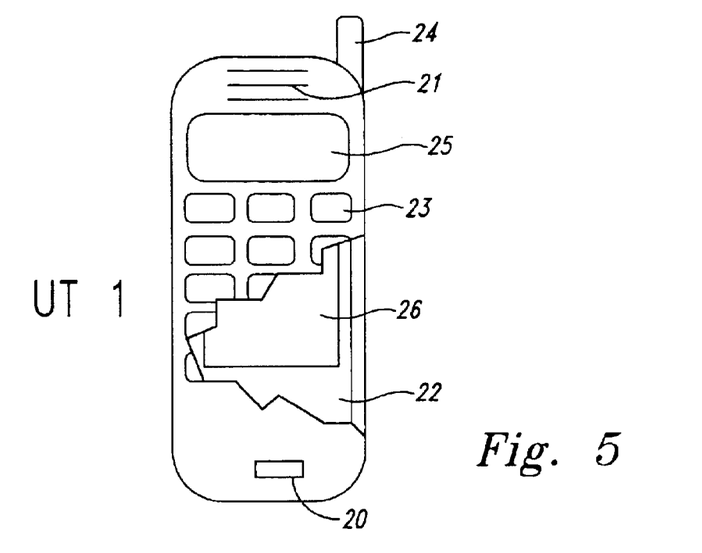
FIG. 5 is a schematic diagram of a mobile user terminal.
Figure 6:
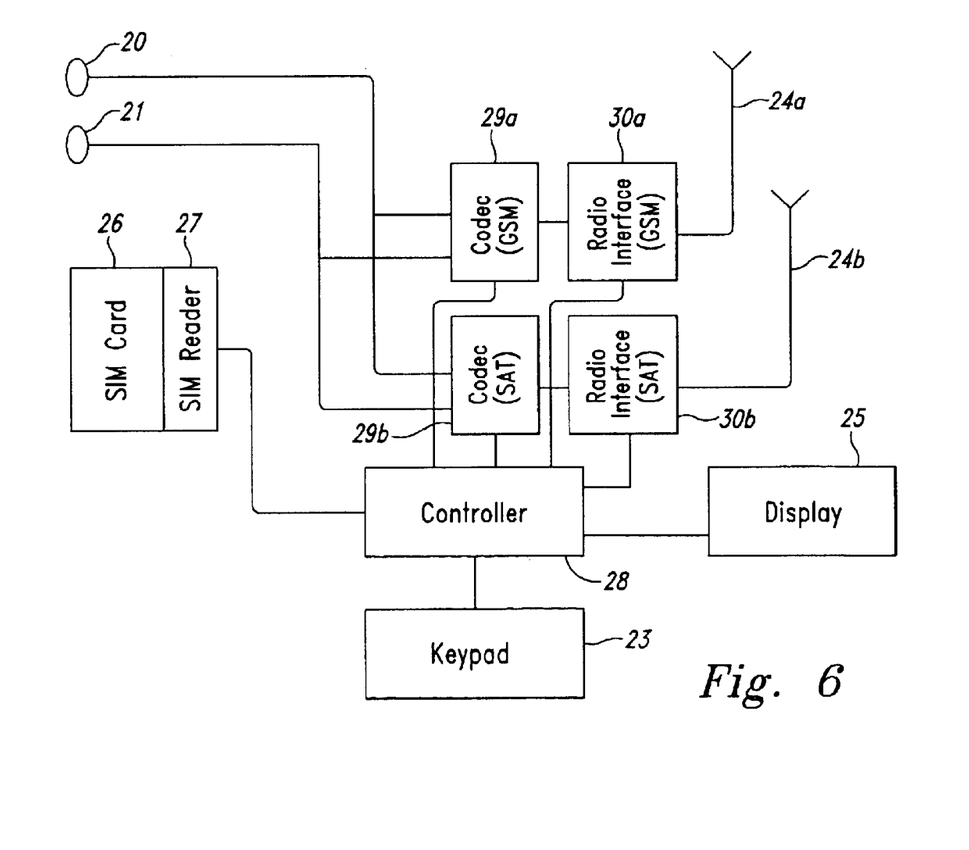
FIG. 6 is a schematic block diagram of the circuits of the user terminal shown in FIG. 4.

The mobile user terminal UT 1 is shown in more detail in FIGS. 5 and 6. It comprises a hand held device which is generally similar to a mobile telephone used for conventional terrestrial GSM networks. It is powered by a rechargeable battery (not shown) and is configured to operate with both the local terrestrial cellular network and the satellite network. Thus, in the example shown in FIG. 1, the mobile handset UT 1 can operate either according to a land-based GSM protocol or roam onto the satellite network protocol. As shown in FIG. 5, the handset comprises a microphone 20, a loudspeaker 21, a battery 22, a keypad 23, antennas 24a, 24b and a display 25. The handheld unit UT 1 also includes a subscriber identification module (SIM) smartcard 26. The circuit configuration of the handset UT 1 is shown in block diagrammatic form in FIG. 6. The SIM card 26 is received in an SIM card reader 27 coupled to a controller 28, typically a microprocessor. The microphone and loudspeaker 20, 21 are coupled to first and second codecs 29a, 29b coupled to conventional radio interfaces 30a, 30b connected to the antennas 24a, 24b so as to transmit and receive communication signals, in a manner well known per se. The handset is capable of dual mode operation, with the codec 29a, radio interface 30a and antenna 24a being used with the GSM PLMN 9, and corresponding circuits 29b, 30b and 24b being used with the satellite network. Amongst other things, the controller 28 can control the gain of the radio interface 30b so as to change adaptively the power at which signals are transmitted by UT 1 to the satellite 3a when the satellite mode of operation is selected. As will be explained hereinafter, the power level is set depending on the quality of the received signals so as to keep the transmitted power level as low as practicable, in order to conserve battery power.

Service Provision

The described network can provide service to customers in a number of different ways. For example, communication may be provided from UT 1 to UT 2 using the satellite backbone network 5. Alternatively, telephone communication can be established between the telephone set 7 and UT 1 either via SAN 1 and satellite 3a, or, through PLMN 9, antenna 10 and link 11. For further description of service options, reference is directed to our EP-A-0 869 628.

In the following, a telephone call established between telephone set 7 and UT 1 through SAN 1 and satellite 3a will be considered in more detail. When voice channel communication is established between telephone set 7 and UT 1 via SAN 1 and satellite 3a, the user terminal UT 1 switches from an idle mode in which it monitors the BCCH to a dedicated mode in which a TCH/SACCH$_{up}$ channel is opened for the uplink and a TCH/SACCH$_{down}$ is opened for the downlink, so as to provide bidirectional communication. When the call is initiated by UT 1, it sends a RACH request and the network allocates a particular TCH/SACCH for the call. The UT is informed of the allocated TCH/SACCH for the call by a message on AGCH. The UT monitors the AGCH for this information after the issuance of a RACH message so that it can tune to the appropriate TCH/SACCH for the call. When the call is initiated from the telephone set 7, a signal is sent from SAN 1 on the paging channel PCH to trigger the UT to send a RACH in order to request a TCH/SACCH, which is then acquired in the same way as a UT initiated call, namely by the UT listening to the AGCH so as to determine details for the TCH/SACCH allocated by the network for the call.

Quality Reporting and Power Control

During the call, the quality of the signals received at UT 1 is reported back to the SBS 1 at SAN 1, in the SACCH$_{up}$ and in response, SBS 1 dynamically adjusts the power level for the downlink and also sends instructions in SACCH$_{down}$ to UT 1 to adjust its power level for the uplink. This ensures that TCH/SACCH$_{down}$ is transmitted via the satellite 3a with sufficient signal strength to be received by UT 1 satisfactorily, and also to ensure that the signal strength from UT 1 to the satellite, is no greater than needed to achieve satisfactory communication. This quality reporting and power level setting will now be described in more detail with reference to FIG. 7 which illustrates the communication flow of power measurement and control signals as a function of time t between SAN 1, satellite 3a and user terminal UT 1.

Idle Mode

Figure 8:
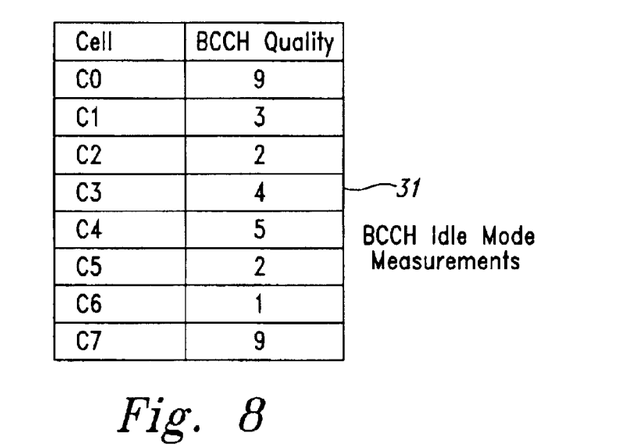
FIG. 8 is a table of idle mode BCCH measurements.

Prior to commencement of a call, at step S0, the user terminal UT 1 monitors the BCCHs of the cell C0 and the surrounding cells and builds a up table 31 of the received signal reception quality, as shown in FIG. 8. The UT is provided with the details of the beacon frequencies of the BCCHs of adjacent cells C1–C7 in a BCCH message for cell C0 so that it can locate the BCCHs for the cells. Each BCCH contains data which identifies the cell concerned, and also the satellite that is producing the corresponding spot beam, as will be discussed later. In the table 31 of FIG. 8, the signal qualities as received by UT 1 for each of the monitored cells C0–C7 are shown schematically on a scale of 1 to 10. The signal qualities may be measured in terms of a bit error rate as in GSM, signal strength or any other suitable parameter. The table of received BCCH signal quality is held in a memory of the controller 28 in the UT shown in FIG. 6.

Dedicated Mode

Figure 7:
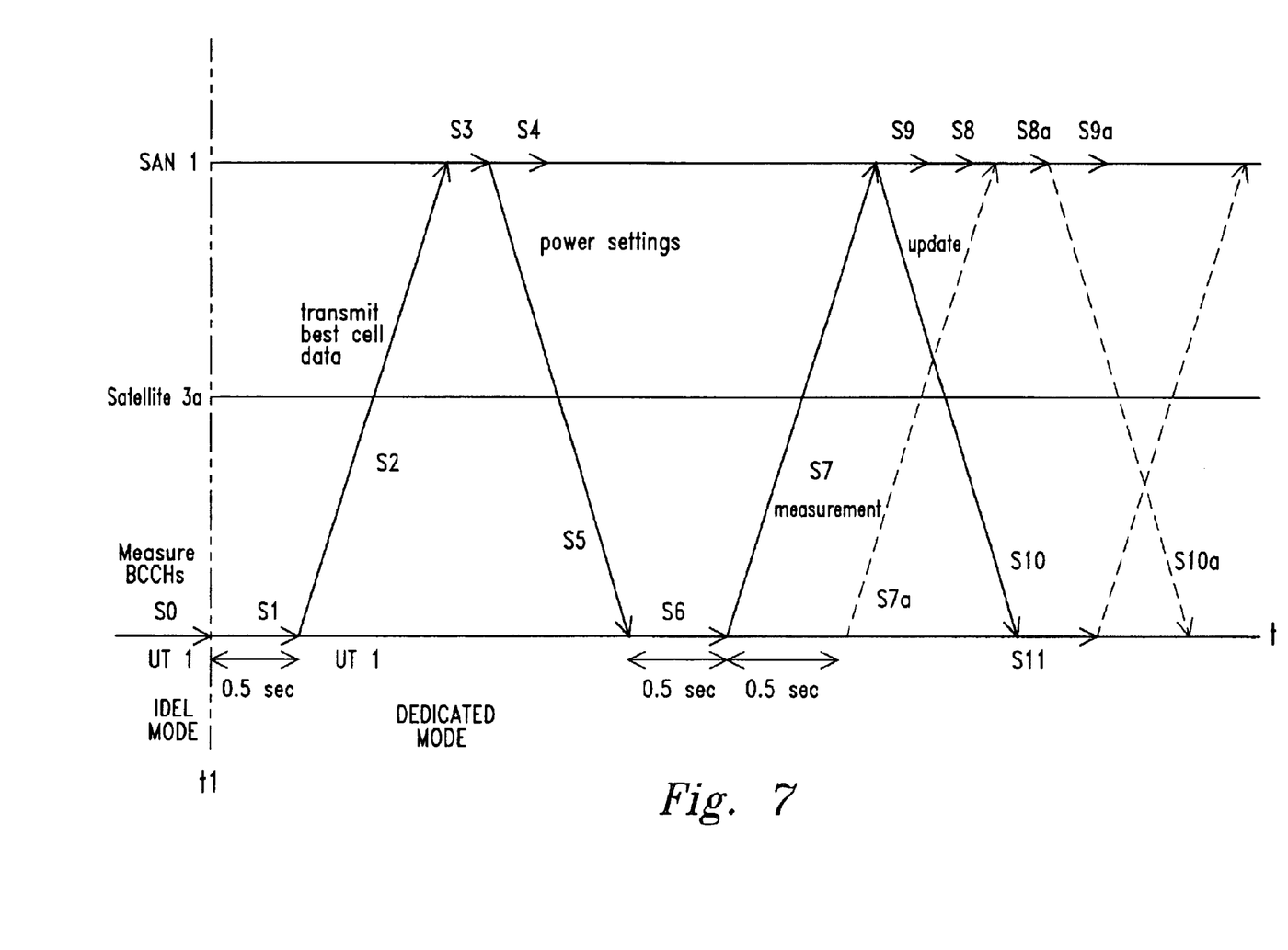
FIG. 7 is a timing diagram for measurements made in the idle mode, quality reporting and power control.

At time $t_1$, the user terminal UT 1 switches from idle mode into dedicated mode to commence a call. As previously explained, at this time a TCH/SACCH is allocated for the call, both for the uplink and downlink. At this early stage in the call, it is not possible to measure the received quality of TCH/SACCH$_{down}$ at the UT and report back to the SAN for the purposes of power control. However, in accordance with the invention, the table 31 of received BCCH quality data of FIG. 8 is reviewed and data corresponding to the reception quality for the best cell of each available satellite, is loaded at step S1 into a SACCH message of TCH/SACCH$_{up}$, as shown in FIG. 7. In this example, the best cell for satellite 3a is cell C0 and the best cell for satellite 3b is C7. In the example, C0 and C7 both have a received signal quality of 9/10. At step S2 details of the cells C0 and C7 and the corresponding values of their reception quality is transmitted by UT 1 in a SACCH$_{up}$ message, to the satellite 3a, and then on to the ground station SAN 1 and SBS 1.

In the following description, it will initially be assumed that the call is to be routed through cell C0. The base station SBS 1 includes a processor which operates on the reception quality data received from UT 1 at step S2, to produce power level instructions for controlling the transmission of TCH/SACCH$_{up}$ and TCH/SACCH$_{down}$. More particularly, the processor operates at step S3 on the received BCCH quality for cell C0 in the idle mode, just prior to the commencement of the call, and sets the power level according to a predetermined algorithm which develops a gain control parameter g for the transmission circuits of SBS 1 and the UT. Thus, if the BCCH quality data for cell C0 indicates a poor reception quality at the UT, the processor algorithm develops a value of g which instructs the SBS 1 and UT 1 to transmit the TCH/SACCH at high power whereas if the BCCH quality data indicates a good reception, the SBS and the UT are instructed to transmit the TCH/SACCH at low power.

The power level instruction g is used at step S4 to set the power of TCH/SACCH$_{down}$ at SBS 1 in SAN 1, in order to control the power of the channel TCH/SACCH$_{down}$ as transmitted by satellite 3a towards UT 1. The instruction g is also encoded in a SACCH message of TCH/SACCH$_{down}$ that is used for the call in the downlink, and transmitted to UT 1 via the satellite 3a at step S5.

The value of gain g is such that the satellite beam processor 19$_{down}$ sets the power level for TCH/SACCH$_{down}$ transmitted to UT 1, to an appropriate value in order to minimise power consumption by the satellite but ensure satisfactory reception by UT 1, the value of gain being set in dependence on the BCCH reception quality in the idle mode at the UT. Furthermore, UT 1 responds to the power level instruction g transmitted at step S5 in the SACCH$_{down}$, so as to adjust its transmitted power level for signals transmitted on the uplink from UT 1 to satellite 3a, to a value indicated by the parameter g to be just sufficient to achieve satisfactory transmission quality but which conserves battery power. The value of g for steps S4 and S5 may be the same or different.

At step S6, the UT 1 performs a measurement of the quality of the received signals from the satellite 3a. This can be carried by measuring the bit error rate in the received TCH/SACCH$_{down}$ as in GSM or the number of errors per burst i.e. the frame error rate (FER) can be monitored. A quality metric based on the average FER and the deviation of the FER samples that make up the average can be produced, as described in our copending EP 98303412.5 entitled Transmission Quality Reporting, filed on Apr. 30, 1998. This may take approximately 0.5 seconds.

At step S7, the measurement of the received signal quality made at step S6 is encoded in SACCH$_{up}$ and transmitted back to SAN 1 via satellite 3a.

At step S8, SBS 1 computes updated power settings g for use by itself and the UT 1. The updated value of g is used by SBS 1 at step S9 to update the power level of TCH/SACCH$_{down}$. The satellite 3a thus adaptively adjusts the power level for TCH/SACCH$_{down}$ transmitted to UT 1, to an appropriate minimum value in order to minimise power consumption by the satellite but ensure satisfactory reception by UT 1.

The updated value of g is also encoded in a SACCH$_{down}$ message and transmitted via the satellite 3a to the user terminal UT 1 at step S10. At step S11, UT 1 adjusts its transmitted power level in response to the instruction given in step S10, in order to preserve battery power.

The quality of the signals received by UT 1 is monitored periodically, for example every 0.5 sec and reported back to SAN 1, as shown schematically by step S7a. Thus, SAN 1 repeatedly responds to the sequential quality reports to adjust the power levels for the satellite 3a and UT 1 as shown schematically by steps S9a, S8a and S10a. The process is repeated until the end of the call, when the UT returns to the idle mode and again measures the received quality of the BCCH in the manner described for step S0.

Diversity and Cell Handover

The table 31 of data (FIG. 8) can be used for purposes other than power control. As previously explained, the data in the table 31 may include BCCH cell reception quality information for spot beams for more than one satellite since in the ICO® system a user terminal is within sight of two satellites for more than 80% of the time. An interactive model of this can be found at ICO website http:\\www.ico.com. Thus, as shown in FIG. 4, UT 1 is able to communicate through cell C7 from the satellite 3b. Accordingly, at the start of the call there are two valid routes for the call through the different satellites 3a, 3b. As previously explained, the data transmitted at step S2 indicates the best cell for each available satellite and so the data received by SAN 1 at step S2 can be used at the start of the call to determine whether it would be possible to route the call through cell C7 (satellite 3b) rather than cell C0 (satellite 3a) for example to relieve signal traffic congestion through satellite 3a. Also, if additional cell data from table 31 is transmitted to SAN 1 at step S2, i.e. not just the best cell for each satellite, the transmitted data from the table 31 can be used to determine whether a handover between cells supported wholly by the satellite 3a would be possible, and to make a choice of cell for the handover on the basis of the transmitted cell data. The decision can be made at the start of the call, without waiting for quality measurements of the TCH/SACCH$_{down}$ at the UT.

Various modifications and variations of the invention are possible. For example, whilst the quality measuring and power control has been described in relation to a satellite telecommunication system, it will be appreciated that it could similarly be applied to a conventional PLMN. For example, considering when a telephone call is routed to UT 1 via the GSM PLMN 9, the power control can be carried out by BSC 1 (in the same manner as SAN 1) so as to instruct BTS 1 to operate at a power level determined by the gain parameter g and to instruct UT 1 when operating with its GSM codec 29a and radio interface 30a (FIG. 5) with a power level set by the gain parameter g. Thus, the quality reporting would be over duplex link 11 shown in FIG. 1.

Also, whilst the error detection at UT 1 is carried out on the basis of a FER or BER, other appropriate quality metrics could be measured and reported back to SAN 1 in order to control the gain.

Although the described system is operative to control the power level of the transmitted signals, or for satellite selection, it can be used to control other, different transmission characteristics of the transmitted signals. It can be used to provide phase control in order to compensate for doppler shift, which needs to be considered for satellite systems. Also, in a GSM system, it can be used to control timing advance.

The invention is not restricted to the described signal channels and can be used with conventional GSM, IS-41 or other known mobile protocols. The invention also can be used with other satellite systems such as the IRIDIUM system discussed hereinbefore. Whilst the user terminals have been described as mobile, it will be understood that they may be semi-mobile, e.g. mounted on a ship or aircraft, and may actually be stationary during operation.

What is claimed is:

1. A method of setting signal characteristics in a cellular telecommunications system in which cells are made available to a user terminal by more than one satellite concurrently, comprising:

in an idle mode when no call is being made, making a plurality of cell reception measurements at a user terminal, said measurements corresponding to the quality of reception of channels transmitted over first and second communication paths via first and second satellites, respectively, the first and second satellites being in non-geosynchronous orbits;

on changing to dedicated mode, reporting information relating to the measurements made in the idle mode to a location remote from the user terminal;

using said measurements at said remote location as a basis for selecting one of the first and second communication paths for a calls; and using said measurements at said remote location as a basis for setting initial characteristics of signals transmitted to the user terminal for the call to thereby permit communication between the user terminal and the selected one of the first and second satellites.

2. A method according to claim 1, wherein a variable transmission characteristic of the transmitter in the user terminal is adjusted as a function of one of said quality measurements.

3. A method according to claim 1, further comprising measuring the bit error rate of data received at the user terminal during a call, reporting said bit error rate measurements to the remote location and adjusting the characteristics of the signals in accordance with said bit error rate measurements.

4. A method according to claim 1, including making the report on a channel associated with speech communication from the user terminal to the remote location.

5. A method according to claim 4, wherein the channel comprises a control channel with a data rate less than the speech communication.

6. A method according to claim 1, including determining the cell with the best reception quality for each available satellite, and providing data concerning the best cell and its reception quality in the reported measurement information.

7. A user terminal for use in a cellular telecommuncations system in which cells are made available to a user terminal by more than one satellite concurrently, comprising:

receiver circuitry configured to make a plurality of cell reception measurements at the user terminal in an idle mode when no call is being made, said measurements corresponding to the quality of reception of channels transmitted over diverse communication paths via first and second satellites; and transmitter circuitry operable on changing to dedicated mode, to report information relating to the measurements made in the idle mode to a location remote from the user terminal, for selecting one of the first and second satellites for a call via a selected one of the first and second satellites and for setting characteristics of signals transmitted to the user terminal for the call.

8. A method of operating a subsystem for use in a cellular telecommunications system to communicate with remote user terminals, in which cells are made available to the user terminals by more than one satellite concurrently, comprising:

receiving from a remote user terminal, a report of cell measurement information corresponding to a plurality of cell reception measurements relating to the quality of reception of channels transmitted over diverse communication paths via first and second satellites and made by the user terminal in an idle mode when no call is being made, the report being made to the subsystem prior to commencement of a call;

selecting one of the diverse communication paths via a selected one of the first and second satellites corresponding to the selected one of the diverse communication paths for the call in dependence on the report; and setting characteristics of signals transmitted to the user terminal for a call in dependence on the report.

9. A method according to claim 8, including setting the power level for signals for the call in dependence upon the report.

10. A method according to claim 8, further comprising receiving information relating to a bit error rate of data received at the user terminal during a call and adjusting the characteristics of the signals in accordance with said information.

11. A subsystem for use in a cellular telecommunications system to communicate with remote user terminals in which cells are made available to the user terminals by more than one satellite concurrently, comprising:

receiver circuitry to receive, from a remote user terminal, a report of cell measurement information corresponding to a plurality of cell reception measurements relating to the quality of reception of channels transmitted over diverse communication paths via first and second satellites and made by the user terminal in an idle mode when no call is being made, the report being made to the subsystem prior to commencement of a call, and setting means to set characteristics of signals transmitted to the user terminal for a call and to select one of the diverse communication paths via either the first or second satellite corresponding to the selected one of the diverse communication paths for routing said signals in dependence on the report.

12. A subsystem according to claim 11, comprising a ground station, wherein the setting means is operable to transmit a setting signal towards one of said satellites for controlling a transmission characteristic thereof for the call.

* * * * *